(12) United States Patent
Mariappan et al.

(10) Patent No.: US 9,538,007 B1
(45) Date of Patent: Jan. 3, 2017

(54) CUSTOMER RELATIONSHIP MANAGEMENT SYSTEM BASED ON ELECTRONIC CONVERSATIONS

(71) Applicant: XEROX CORPORATION, Norwalk, CT (US)

(72) Inventors: Ragunathan Mariappan, Chennai (IN); Shourya Roy, Bangalore (IN)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/930,965

(22) Filed: Nov. 3, 2015

(51) Int. Cl.
| | | |
|---|---|---|
| *H04M 3/00* | (2006.01) | |
| *H04M 5/00* | (2006.01) | |
| *H04M 3/51* | (2006.01) | |
| *H04M 3/523* | (2006.01) | |

(52) U.S. Cl.
CPC .......... *H04M 3/5175* (2013.01); *H04M 3/51* (2013.01); *H04M 3/5183* (2013.01); *H04M 3/5232* (2013.01); *H04M 2203/404* (2013.01); *H04M 2203/551* (2013.01)

(58) Field of Classification Search
CPC ........ G10L 15/00; G06Q 10/06; H04M 3/323; H04M 3/36; H04M 3/4217; H04M 3/4285; H04M 3/42195; H04M 3/493; H04M 3/4931; H04M 3/4933; H04M 3/4935; H04M 3/4936; H04M 3/4938; H04M 3/42221; H04M 3/51; H04M 3/5166; H04M 3/5175; H04M 3/5183; H04M 3/5191; H04M 3/523; H04M 3/5231; H04M 3/5232; H04M 3/5233; H04M 3/5235; H04M 3/5237; H04M 3/5238; H04M 2203/2011; H04M 2203/2061; H04M 2242/00; H04M 2242/08; H04M 2242/12

USPC .......... 379/210.01, 265.01, 265.02, 265.03,379/265.04, 265.05, 265.06, 265.07, 265.08,379/265.09, 265.1, 265.11, 265.12, 265.13,379/265.14, 266.01, 266.02, 266.03, 266.04,379/266.05, 266.06, 266.07, 266.08, 266.09,379/266.1

See application file for complete search history.

(56) References Cited

U.S. PATENT DOCUMENTS

| | | |
|---|---|---|
| 5,138,377 A | 8/1992 | Smith et al. |
| 5,737,739 A | 4/1998 | Shirley et al. |
| 6,373,939 B1 * | 4/2002 | Reese et al. ........ H04M 3/5183 379/265.02 |
| 6,513,013 B1 | 1/2003 | Stephanou |
| | (Continued) | |

OTHER PUBLICATIONS

S. Forrest, C.Warrender, and B. Pearlmutter, "Detecting intrusions using system calls: Alternate data models," In Proceedings of the 1999 IEEE ISRSP. Washington, DC, USA: IEEE Computer Society,1999, pp. 133-145.

*Primary Examiner* — Khai N Nguyen

(57) ABSTRACT

The disclosed embodiments illustrate methods and systems for managing a conversation between a first user and a customer care agent. The method includes extracting one or more features from a first conversation between said first user and said customer care agent. The first conversation corresponds to an ongoing conversation over an electronic communication medium. The method includes determining a score for a feature. The score indicates a deviation of a value of said feature from an average of values of said feature determined from historical conversations involving said first user. The method includes aggregating said score for each of said one or more features of said first conversation. Thereafter, the method includes redirecting said first conversation of said first user to a third user during said first conversation based on said aggregation. The third user (Continued)

manages said first conversation between said first user and said customer care agent.

25 Claims, 4 Drawing Sheets

(56) References Cited

U.S. PATENT DOCUMENTS

| | | | | |
|---|---|---|---|---|
| 6,611,498 | B1* | 8/2003 | Baker et al. | G06F 11/0709 |
| | | | | 370/252 |
| 6,959,081 | B2 | 10/2005 | Brown et al. | |
| 8,370,155 | B2* | 2/2013 | Byrd et al. | G06Q 10/10 |
| | | | | 379/88.01 |
| 8,787,555 | B2 | 7/2014 | Gonen et al. | |
| 2002/0037073 | A1* | 3/2002 | Reese et al. | H04M 3/5166 |
| | | | | 379/88.01 |
| 2002/0054587 | A1* | 5/2002 | Baker et al. | G06F 11/0709 |
| | | | | 370/352 |
| 2007/0206772 | A1* | 9/2007 | Sato et al. | H04M 3/42221 |
| | | | | 379/265.02 |
| 2008/0152122 | A1* | 6/2008 | Idan et al. | H04M 3/5175 |
| | | | | 379/265.07 |
| 2010/0274618 | A1* | 10/2010 | Byrd et al. | G06Q 10/10 |
| | | | | 704/275 |
| 2014/0257820 | A1* | 9/2014 | Laperdon et al. | G10L 25/63 |
| | | | | 704/270 |
| 2015/0103998 | A1* | 4/2015 | Rosandich et al. | H04M 3/5158 |
| | | | | 379/266.01 |
| 2015/0213800 | A1* | 7/2015 | Krishnan et al. | H04M 3/4936 |
| | | | | 704/246 |

* cited by examiner

CUSTOMER RELATIONSHIP MANAGEMENT SYSTEM BASED ON ELECTRONIC CONVERSATIONS

TECHNICAL FIELD

The presently disclosed embodiments are related, in general, to a customer relationship management (CRM) systems. More particularly, the presently disclosed embodiments are related to methods and systems for managing a conversation in the CRM system.

BACKGROUND

As computers and software proliferate, a need for a help desk assistance may be critical for those customers who may not be technically sophisticated. The need for the help desk assistance may be provided either through customer care representatives, or automated agents. Usually, the customer care representatives may be trained to handle limited problems that the customers frequently face while using a product or a service. Further, the customer care representatives usually have a predefined set of steps that will ask the customers to follow in order to overcome a problem. This may lead to the customers becoming frustrated. On the other hand, the automated agents may be trained only to handle certain common problems. Typically in such scenarios, the customer problem is unknown to the automated agents. Further, a highly valued customer is unhappy with the automated agent's support. Hence, organizations may face a very challenging task to maintain their communication with their customers. Thus, such methods may not result in a good customer experience.

SUMMARY

According to embodiments illustrated herein, there is provided a method for managing a conversation between a first user and a customer care agent. The method includes extracting one or more features from a first conversation between said first user and said customer care agent. The first conversation corresponds to an ongoing conversation over an electronic communication medium. The method further includes determining a score for a feature from said one or more features. The score indicates a deviation of a value of said feature from an average of values of said feature determined from one or more historical conversations involving said first user. The method further includes aggregating said score for each of said one or more features of said first conversation. Thereafter, the method includes said first conversation of said first user to a third user during said first conversation based on said aggregation. The third user manages said first conversation between said first user and said customer care agent. The method is performed by one or more microprocessors.

According to embodiments illustrated herein, there is provided a system for managing a conversation between a first user and a customer care agent. The system includes one or more microprocessors operable to extract one or more features from a first conversation between said first user and said customer care agent. The first conversation corresponds to an ongoing conversation over an electronic communication medium. The system further includes one or more microprocessors operable to determine a score for a feature from said one or more features. The score indicates a deviation of a value of said feature from an average of values of said feature determined from one or more historical conversations involving said first user. The system includes one or more microprocessors operable to aggregate said score for each of said one or more features of said first conversation. Thereafter, the system includes one or more microprocessors operable to redirect said first conversation of said first user to a third user during said first conversation based on said aggregation. The third user manages said first conversation between said first user and said customer care agent.

According to embodiments illustrated herein, there is provided a computer program product for use with a computing device. The computer program product comprises a non-transitory computer readable medium, the non-transitory computer readable medium stores a computer program code for managing a conversation between a first user and a customer care agent. The computer program code is executable by one or more microprocessors to extract one or more features from a first conversation between said first user and said customer care agent. The first conversation corresponds to an ongoing conversation over an electronic communication medium. The computer program code is further executable by said one or more microprocessors to determine a score for a feature from said one or more features. The score indicates a deviation of a value of said feature from an average of values of said feature determined from one or more historical conversations involving said first user. The computer program code is further executable by said one or more microprocessors to aggregate said score for each of said one or more features of said first conversation. Thereafter, the computer program code is further executable by said one or more microprocessors to redirect said first conversation of said first user to a third user during said first conversation based on said aggregation. The third user manages said first conversation between said first user and said customer care agent.

BRIEF DESCRIPTION OF DRAWINGS

The accompanying drawings illustrate the various embodiments of systems, methods, and other aspects of the disclosure. Any person with ordinary skill in the art will appreciate that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa. Furthermore, the elements may not be drawn to scale.

Various embodiments will hereinafter be described in accordance with the appended drawings, which are provided to illustrate and not to limit the scope in any manner, wherein similar designations denote similar elements, and in which.

DETAILED DESCRIPTION

Figure 1:
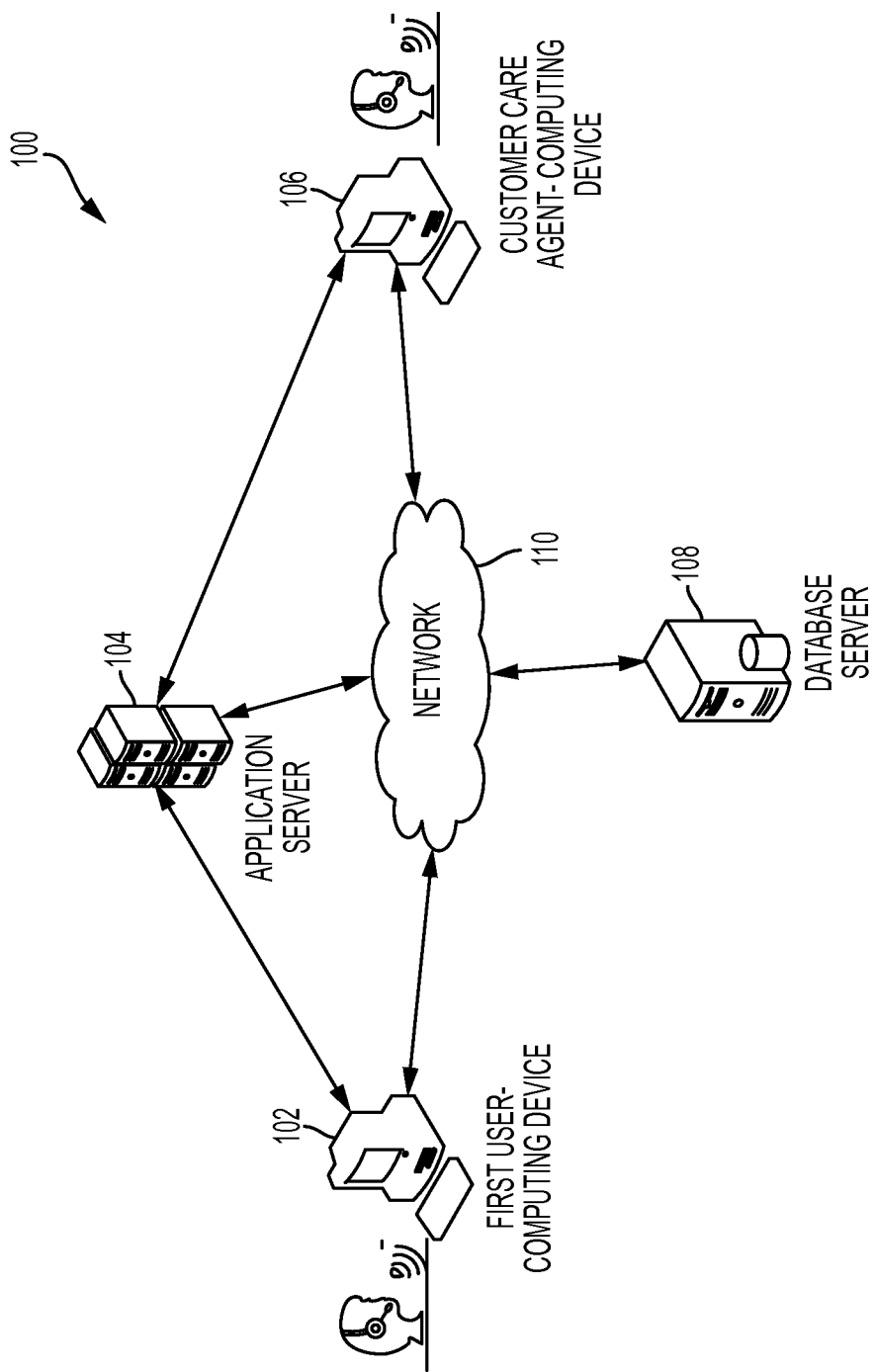
FIG. 1 is a block diagram illustrating a system environment in which various embodiments may be implemented.

The present disclosure is best understood with reference to the detailed figures and description set forth herein.

Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment," "at least one embodiment," "an embodiment," "one example," "an example," "for example," and so on indicate that the embodiment(s) or example(s) may include a particular feature, structure, characteristic, property, element, or limitation, but that not every embodiment or example necessarily includes that particular feature, structure, characteristic, property, element, or limitation. Further, repeated use of the phrase "in an embodiment" does not necessarily refer to the same embodiment.

DEFINITIONS

The following terms shall have, for the purposes of this application, the meanings set forth below.

A "computing device" refers to a device that includes one or more processors/microcontrollers and/or any other electronic components, or a device or a system that performs one or more operations according to one or more programming instructions/codes. Examples of the computing device may include, but are not limited to, a desktop computer, a laptop, a personal digital assistant (PDA), a mobile device, a Smartphone, a tablet computer (e.g., iPad®, and Samsung Galaxy Tab®), and the like.

An "electronic communication medium" refers to a communication medium over which two or more users may communicate with each other. In an embodiment, one or more wired and wireless communication protocols may be utilized such as Transmission Control Protocol and Internet Protocol (TCP/IP), User Datagram Protocol (UDP), and 2G, 3G, or 4G communication protocols. In an embodiment, the electronic communication medium may include, but not limited to a face to face, a telephonic, a video conference, a SMS, a chat, social networks, an email, or a phone. For instance, a conversation may takes place over the electronic communication medium such as voice calls. The voice calls may be Public switched telephone network (PSTN), or a voice over internet protocol (VOIP). A person having an ordinary skill in the art will understand that scope of the disclosure is not limited to conversations corresponding to the voice calls only. In another embodiment, the conversation may correspond to a text message conversation, an email conversation, or other messaging services.

"Conversation" refers to a form of an interactive communication that may take place between two or more users over a communication network. In an embodiment, the conversation may correspond to a first conversation, and one or more historical conversations. For instance, the conversation may takes place in a form of a voice call or a text message. In an embodiment, the conversation may correspond to an electronic conversation. In an embodiment, in the electronic conversation, the one or more messages are transmitted over an electronic medium such as, but not limited to, computer networks, satellite networks, mobile networks and the like.

"First conversation" refers to a conversation between a first user and a customer care agent. In an embodiment, the first conversation may correspond to an ongoing conversation (i.e., a real time conversation) between the first user and the customer care agent over the electronic communication medium.

"Historical conversations" refer to one or more previous conversations involving the first user and one or more customer care agents. In an embodiment, the conversation history may be stored in a storage system such as a database, cloud system, or work logs. In an embodiment, one or more historical conversations may include one or more features associated with each conversation. In an embodiment, the one or more historical conversations may be indexed according to the first user.

A "first user" refers to an individual, who may ask a problem/query/complaint/request from a customer care agent. In an embodiment, the first user may initiate a conversation with a customer care agent over an electronic communication medium. For instance, the first user may transmit/send a message/email, corresponding to a problem/query/issue/complaint/request, to a customer care agent. In an embodiment, the first user may initiate a call with the customer care agent. The first user may correspond to at least a customer, a user, or a client.

A "customer care agent" refers to an individual, a machine, or a software program, which provides one or more responses corresponding to a problem/query/issue/complaint/request asked by the first user (in a form of the message or a voice call) during the first conversation. In an embodiment, the customer care agent may be responsible for providing one or more solutions or services to the first user. In an embodiment, the customer care agent may correspond to at least an automated agent, or a customer care representative.

A "third user" refers to an individual, who may manage ongoing conversation (i.e., the first conversation) of the first user by providing one or more solutions corresponding to the problem/query/issue/complaint/request asked by the first user during the first conversation. For instance, in an embodiment, the third user may manage a redirected call of the first user. In an embodiment, the third user may correspond to at least an expert, a supervisor, or a manager.

"One or more features" refer to features of a conversation. In an embodiment, the one or more features may include, but are not limited to, the first user's turnaround time, a customer care agent's turnaround time, a turn length of the first user, a turn length of the customer care agent, sentiments of the first user and the customer care agent, a speaking rate of the customer care agent, or the customer care agent's response delay. In an embodiment, each of the one or more features are observed for a complete duration of the conversation. A person skilled in the art will understand that the values of the one or more features may be sampled at a predefined time intervals during the duration of the conversation. In an embodiment, the values of the one or more features may be temporally ordered based on a time instance, in the conversation, at which the value was observed.

"Turnaround time" refers to the time elapsed between the transmission of one or more queries from the first user to the customer care agent and the transmission of one or more responses corresponding to the query from the customer care agent to the first user. In an embodiment, the turnaround time may correspond to a first user's turnaround time, and a customer care agent's turnaround time.

"Turn Length" refers to a time interval in which a user is in a conversation (over a text or audio channel) with a customer care agent. In an embodiment, the turn length may correspond to the turn length of the first user and the turn length of the customer care agent. For example, in a conversation, during the first user's turn, if the first user asks a query to the customer care agent in "1" min, then the turn length of the first user is "1" min. Similarly, during the customer care agent's turn, if the customer care agent responds to the query asked by the first user in "15" seconds, then the turn length of the customer care agent is "15" seconds.

"Speaking rate" refers to a speech rate at which a user speaks or talks during the conversation. In an embodiment, the speaking rate may correspond to a number of words spoken by a user in a minute.

"Sentiments" refer to feelings or emotions that a user possesses during the conversation. In an embodiment, the sentiments refer to reactions that last for a short time, ranging from seconds to minutes. Sentiments are attached to context expressed in one or more conversations. In an embodiment, the sentiments may correspond to the sentiments of the first user, and the sentiments of the customer care agents.

"Response delay" refers to a delay in responding to a query from the first user associated with a response received from the customer care agent corresponding to the problem/query/issue/complaint/request asked by the first user.

An "average" refers to any mathematical operation in which multiple data values are caused to be effectively summarized, for any purpose, as a single data value. For example, an average may correspond to, but is not limited to, a rolling average, a weighted average, a median, a mode, or any result of any applied mathematical or statistical techniques.

A "score" refers to a deviation of a value of a feature (extracted from an ongoing conversation) from an average of values of the feature (determined from the one or more historical conversations). In an embodiment, the score for a feature may be determined by utilizing at least an anomaly detection technique, or a deviation computation technique.

An "aggregated score" refers to a weighted sum of the score for each of the one or more features of the first conversation. In an embodiment, the aggregated score may be determined based at least on the aggregation of the score for each of the one or more features of the first conversation.

FIG. 1 is a block diagram of a system environment 100, in which various embodiments can be implemented. The system environment 100 includes a first user-computing device 102, an application server 104, a customer care agent-computing device 106, a database server 108, and a network 110. Various devices in the system environment 100 (e.g., the first user-computing device 102, the application server 104, the customer care agent-computing device 106, and the database server 108) may be interconnected over the network 110.

In an embodiment, the first user-computing device 102 may comprise one or more processors coupled to one or more memories. The first user-computing device 102 may be operable to execute one or more sets of instructions stored in the one or more memories. In an embodiment, the first user-computing device 102 may be communicatively coupled to the network 110. In alternate embodiment, the first user-computing device 102 may be also connected to the application server 104. The first user-computing device 102 may refer to a computing device used by a first user. In an embodiment, the first user may utilize the first user-computing device 102 to initiate a conversation with a customer care agent over an electronic communication medium. In an embodiment, the electronic communication medium may include, but not limited to a SMS, a chat, social networks, an email, or a phone. Further, in an embodiment, the conversation may correspond to a problem/query/issue/request/complaint that the first user may want to ask a customer care agent associated with the customer care agent-computing device 106 for a solution. Further, the first user may utilize the first user-computing device 102 to receive one or more solutions/responses pertaining to the query from the customer care agent-computing device 106.

In an embodiment, the first user-computing device 102 may correspond to various types of computing devices such as, but not limited to, a desktop computer, a laptop, a personal digital assistant (PDA), a mobile device, a smartphone, a tablet computer (e.g., iPad® and Samsung Galaxy Tab®), and the like.

The application server 104 may refer to a computing device or a software framework that may provide a generalized approach to create the application server implementation. In an embodiment, the function of the application server 104 may be dedicated to the efficient execution of procedures, such as, but not limited to, programs, routines, or scripts stored in one or more memories for supporting its applied applications. In an embodiment, the application server 104 may be configured to monitor the conversation between the first user and the customer care agent. In an embodiment, the application server 104 may retrieve one or more historical conversations (i.e., past conversations) involving the first user from the database server 108. Further, the application server 104 may extract one or more features from the one or more historical conversations involving the first user and one or more customer care agents. Further, the application server 104 may extract the one or more features of the ongoing conversation between the first user and the customer care agent. Based on the one or more features of the one or more historical conversations and the one or more features of the ongoing conversation, the application server 104 may redirect the ongoing conversation of the first user to a third user. A method for redirection of the ongoing conversation to the third user has been explained later in conjunction with FIG. 3.

In an embodiment, the application server 104 may be realized through various web-based technologies such as, but not limited to, a Java web-framework, a .NET framework, a PHP framework, or any other web-application framework. The application server 104 has been described later in conjunction with FIG. 2.

A person with ordinary skill in the art will understand that the scope of the disclosure is not limited to the application server 104, the customer care agent-computing device 106, or the database server 108 as a separate entity. In an embodiment, the functionalities of the database server 108 may be integrated into the application server 104 and/or the customer care agent-computing device 106.

The customer care agent-computing device 106 may comprise one or more processors coupled to one or more memories. The customer care agent-computing device 106 may be operable to execute one or more sets of instructions stored in the one or more memories. In an embodiment, the customer care agent-computing device 106 may be communicatively coupled to the network 110. In alternate embodiment, the customer care agent-computing device 106 may be also connected to the application server 104. The customer care agent-computing device 106 may refer to a computing device used by a customer care agent. In an embodiment, the customer care agent-computing device 106 may receive a request to initiate a conversation with the first user from a first user-computing device 102. The customer care agent may transmit one or more responses corresponding to problems/queries/complaints/requests/issues asked by the first user over the electronic communication medium. In an embodiment, the customer care agent may utilize the customer care agent-computing device 106 to send the responses. Further, the customer care agent-computing device 106 may assign a priority to one or more first users based on a criticality of a first user as a consumer to the organization.

In an embodiment, the customer care agent-computing device 106 may correspond to various types of computing devices such as, but not limited to, a desktop computer, a laptop, a personal digital assistant (PDA), a mobile device, a smartphone, a tablet computer (e.g., iPad® and Samsung Galaxy Tab®), and the like.

The database server 108 may refer to a computing device or a storage system that may be configured to store one or more historical conversations involving the first user, in accordance with at least one embodiment. In an embodiment, the database server 108 may store the one or more historical conversations in such a way that the historical conversations are indexed according to the first user. Further, the database server 108 may store metadata associated with each of the one or more historical conversations. The metadata may comprise, but not limited to, one or more features associated with each of the one or more historical conversations, a timestamp associated with each of the one or more historical conversations, and one or more priorities associated with each of the one or more historical conversations.

In an embodiment, the database server 108 may be communicatively coupled over the network 110. In an embodiment, the database server 108 may receive a query from the application server 104 to retrieve the information (e.g., the historical conversations, the metadata, the threshold value, etc.). For querying the database server 108, one or more querying languages may be utilized such as, but not limited to, SQL, QUEL, DMX and so forth. Further, the database server 108 may be realized through various technologies such as, but not limited to, Microsoft® SQL Server, Oracle®, IBM DB2®, Microsoft Access®, PostgreSQL®, MySQL® and SQLite®, and the like. In an embodiment, the database server 108 may connect to the first user-computing device 102, the application server 104, and/or the customer care agent-computing device 106, using one or more protocols such as, but not limited to, ODBC protocol and JDBC protocol.

It will be apparent to a person skilled in the art that the functionalities of the database server 108 may be incorporated into the application server 104, without departing from the scope of the disclosure. In such a scenario, various types of information, as disclosed above, may be stored in the application server 104.

The network 110 corresponds to a medium through which conversations and messages (e.g., ongoing conversation (i.e., a first conversation), one or more historical conversations, one or more features associated with each of the one or more historical conversations and the ongoing conversation etc.) flow between various devices of the system environment 100 (e.g., the first user-computing device 102, the application server 104, the customer care agent-computing device 106, and the database server 108). Examples of the network 110 may include, but are not limited to, a Wireless Fidelity (Wi-Fi) network, a Wireless Area Network (WAN), a Local Area Network (LAN), or a Metropolitan Area Network (MAN). Various devices in the system environment 100 can connect to the network 110 in accordance with various wired and wireless communication protocols such as Transmission Control Protocol and Internet Protocol (TCP/IP), User Datagram Protocol (UDP), and 2G, 3G, or 4G communication protocols.

Figure 2:
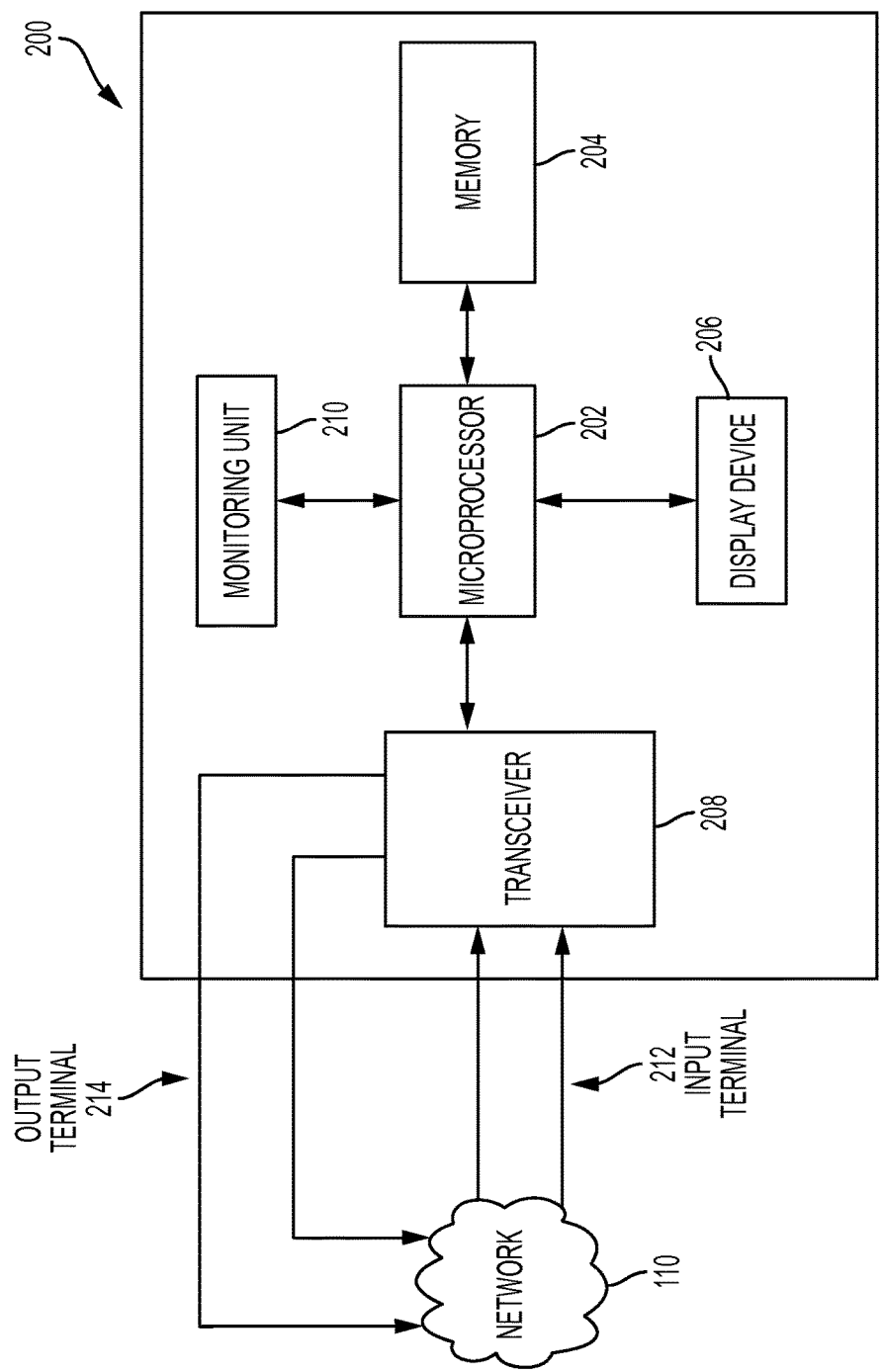
FIG. 2 is a block diagram illustrating a computing device, in accordance with at least one embodiment.

FIG. 2 is a block diagram illustrating a computing device 200, in accordance with at least one embodiment. The computing device 200 may correspond to at least one of the application server 104, or the customer care agent-computing device 106. In an embodiment, the computing device 200 includes a microprocessor 202, a memory 204, a display device 206, a transceiver 208, and a monitoring unit 210. The transceiver 208 is coupled to the network 110 through an input terminal 212 and an output terminal 214. For the purpose of the ongoing description, the computing device 200 has been considered as the application server 104; however, a person skilled in the art will appreciate that the scope of the disclosure is not restricted to the computing device 200 as the application server 104. In an embodiment, the computing device 200 may be realized as the customer care agent-computing device 106.

The microprocessor 202 is coupled to the memory 204, the display device 206, the transceiver 208, and the monitoring unit 210. The microprocessor 202 includes suitable logic, circuitry, and/or interfaces that are operable to execute one or more instructions stored in the memory 204 to perform predetermined operation. The memory 204 may be operable to store the one or more instructions. The microprocessor 202 may be implemented using one or more processor technologies known in the art. Examples of the microprocessor 202 include, but are not limited to, an x86 microprocessor, a RISC microprocessor, an ASIC microprocessor, a CISC microprocessor, or any other microprocessor.

A person skilled in the art will appreciate that the scope of the disclosure should not be limited to the computing device 200 including a single processor. The computing device 200 may include more than one microprocessors, which may operate in parallel and perform the one or more predetermined operations. Further, in an embodiment, the microprocessor 202 may be capable of performing more than one operations in parallel. For example, the microprocessor 202 may be a multi-threaded processor, which may execute more than one threads/processes concurrently. Each such thread/process may be executed to perform a predetermined operation.

The memory 204 stores a set of instructions and data. Some of the commonly known memory implementations include, but are not limited to, a Random Access Memory (RAM), a Read Only Memory (ROM), a Hard Disk Drive (HDD), and a Secure Digital (SD) card. Further, the memory 204 includes the one or more instructions that are executable by the microprocessor 202 to perform specific operations. It will be apparent to a person having ordinary skill in the art that the one or more instructions stored in the memory 204 enables the hardware of the computing device 200 to perform the predetermined operation.

The display device 206 may comprise suitable logic, circuitry, interfaces, and/or code that may be operable to render a display. In an embodiment, the display device 206 may be realized through several known technologies such as, Cathode Ray Tube (CRT) based display, Liquid Crystal Display (LCD), Light Emitting Diode (LED) based display, Organic LED display technology, and Retina display technology. In addition, in an embodiment, the display device 206 may facilitate the third user to view information presented on the computing device 200. For example, the third user may view the deviation of a value of the feature from the average of values of the feature of each of the one or more historical conversations on the display device 206, or the third user may view whether the aggregated score is greater than a threshold value. Further, the display device 206 may facilitate the third user to respond to the redirected conversation of the first user. It may be apparent to a person skilled in the art that the display device 206 may be a part of the first user-computing device 102. In such type of scenarios, the display device 206 may display problems/queries/complaints/requests/issues asked by the first user. In such a scenario, the display device 206 may be a touch screen that enables the first user to ask the problems/queries/complaints/requests/issues.

In an embodiment, the display device 206 may be a part of the customer care agent-computing device 106. In an embodiment, the display device 206 may receive one or more solutions from the customer care agent corresponding to the problems/queries/complaints/requests/issues asked by the first user. In an embodiment, the display device 206 may be a touch screen that enables the customer care agent to provide one or more solutions.

In an embodiment, the touch screen may correspond to at least one of a resistive touch screen, capacitive touch screen, or a thermal touch screen. In an embodiment, the display device 206 may receive input through a virtual keypad, a stylus, a gesture, and/or touch based input.

The transceiver 208 transmits and receives messages and data to/from various components of the system environment 100 (e.g., the first user-computing device 102, the application server 104, and the customer care agent-computing device 106) over the network 110. In an embodiment, the transceiver 208 may receive the problems/queries/requests/complaints/issues from the first user associated with the first user-computing device 102. Further, the transceiver 208 may receive one or more solutions corresponding to the problems/queries/requests/complaints/issues asked by the first user from the customer care agent associated with the customer care agent-computing device 106. In an embodiment, the transceiver 208 may redirect the ongoing conversation of the first user to the third user based at least on an availability of the third user, an aggregation, or the determined aggregated score being greater than threshold value. In an embodiment, the transceiver 208 is coupled to the input terminal 212 and the output terminal 214 through which the transceiver 208 may receive and transmit data/messages respectively. Examples of the transceiver 208 may include, but are not limited to, an antenna, an Ethernet port, a USB port, or any other port that can be configured to receive and transmit data. The transceiver 208 transmits and receives data/messages in accordance with the various communication protocols such as TCP/IP, UDP, and 2G, 3G, or 4G communication protocols.

The monitoring unit 210 is configured to monitor the first conversation (i.e., the ongoing conversation) between the first user and the customer care agent. In an embodiment, the monitoring unit 210 may extract the one or more features of the ongoing conversation. In an embodiment, the ongoing conversation may correspond to a voice call, text messages, an email, or other messaging services. In an embodiment, the messages in the ongoing conversation may be communicated through the monitoring unit 210. Therefore, the monitoring unit 210 has access to those messages. Further, the monitoring unit 210 may store the messages being exchanged between the first user and the customer care agent in the memory 204. In an embodiment, the monitoring unit 210 may include a voice recognition module, or a text recognition module to analyze the messages in the ongoing conversation. Though the monitoring unit 210 is depicted as separate from the microprocessor 202 in FIG. 2, a person skilled in the art will appreciate that the functionalities of the monitoring unit 210 may be implemented within the microprocessor 202 without departing from the scope of the disclosure. In an embodiment, the monitoring unit 210 may be implemented on an Application specific integrated circuit (ASIC), System on Chip (SoC), Field Programmable Gate Array (FPGA), etc.

Figure 3:
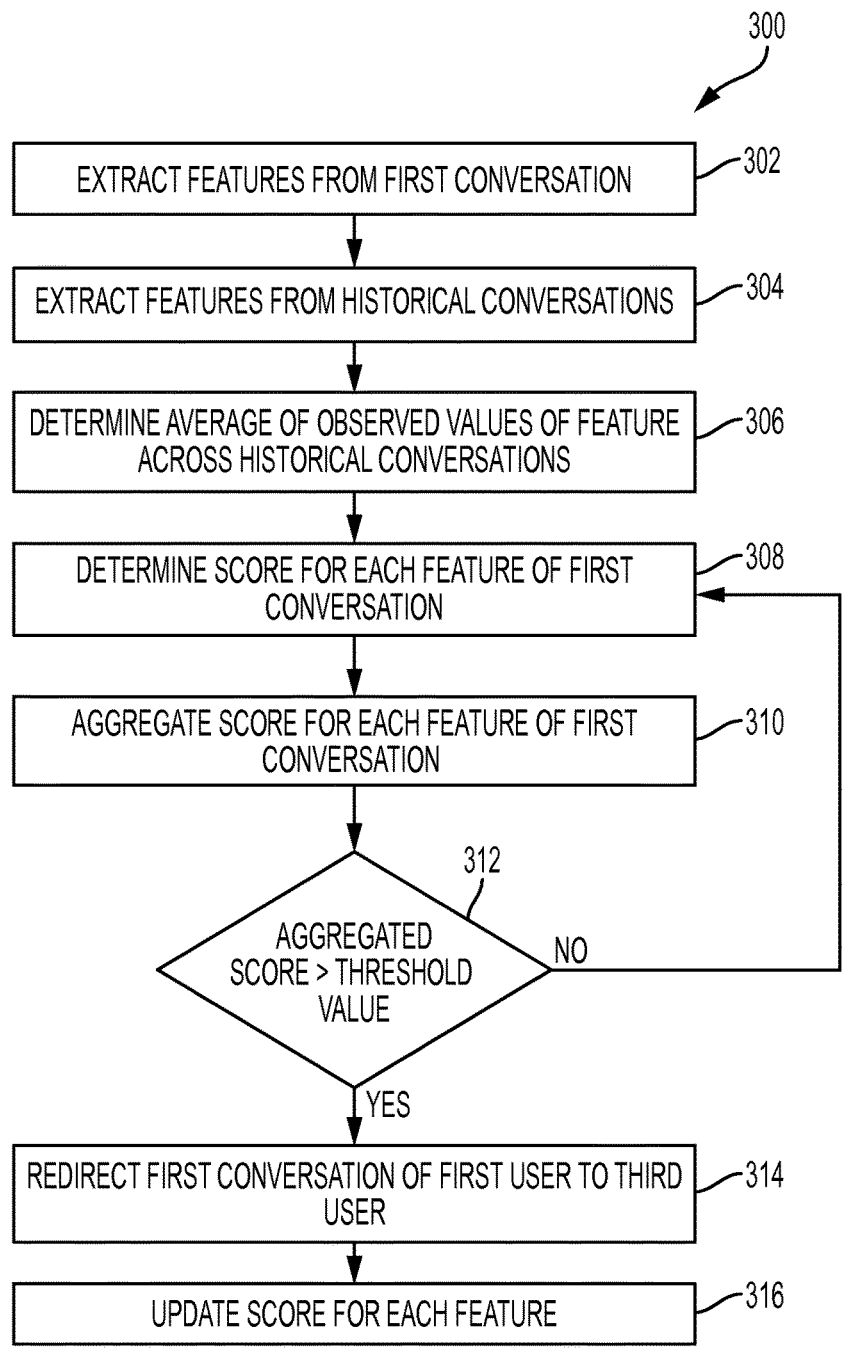
FIG. 3 is a flowchart illustrating a method for managing a conversation between a first user and a customer care agent, in accordance with at least one embodiment.

An embodiment of the operation of the computing device 200 for managing the conversation between the first user and the customer care agent has been described in conjunction with FIG. 3.

In operation, the microprocessor 202 may extract the one or more historical conversations involving the first user from the database server 108. In an embodiment, the one or more historical conversations may correspond to one or more past conversations between the first user and one or more customer care agents. In an embodiment, the first user may correspond to a customer, who may have faced some problems/issues/complaints in a product/service. Further, in an embodiment, the one or more customer care agents may correspond to one or more customer care representatives that may assist the first user in solving the problem that the first user is facing.

Further, the microprocessor 202 may determine one or more features of each of the one or more historical conversations. In an embodiment, the one or more features may include, but not limited to the first user's turnaround time, the customer care agent's turnaround time, a turn length of the first user, a turn length of the customer care agent, sentiments of the first user and the customer care agent, a speaking rate of the customer care agent, or the customer care agent's response delay. In an embodiment, the microprocessor 202 may extract values of each feature from each of the one or more historical conversations. Thereafter, based on the extracted values of the feature, the microprocessor 202 may determine an average of the values of the feature by utilizing an average computation technique.

In an embodiment, the first user may utilize the first user-computing device 102 to initiate the first conversation (i.e., the ongoing conversation) with the customer care agent. The monitoring unit 210 may monitor the first conversation between the first user and the customer care agent. In an embodiment, the conversation may correspond to a voice call, text messages, an email, or other messaging services. In an embodiment, the microprocessor 202 may extract the one or more features from the first conversation between the first user and the customer care agent.

After extracting the one or more features from the first conversation, the microprocessor 202 may compare the value of each feature of the first conversation with the average value of the corresponding feature determined from the one or more historical conversations. Based on the comparison, the microprocessor 202 may determine a score for each feature. In an embodiment, the score may indicate a deviation of value of the feature (extracted from the ongoing conversation) from the average of values of the feature determined from the one or more historical conversations involving the first user (as discussed above).

Thereafter, the microprocessor 202 may aggregate the score of each of the one or more features extracted from the first conversation. Based on the aggregation, the microprocessor 202 may determine an aggregated score. Further, the microprocessor 202 may determine whether the aggregated score is greater than the threshold value. Thereafter, based at least on the determined aggregated score being greater than the threshold value, and the availability of the third user, the microprocessor 202 may redirect the first conversation of the first user to the third user. Thereafter, the first conversation of the first user may be managed by the third user. The first conversation of the first user managed by the third user has been described later in conjunction with FIG. 3.

FIG. 3 is a flowchart 300 illustrating a method for managing a conversation between a first user and a customer care agent, in accordance with at least one embodiment. The flowchart 300 has been described in conjunction with FIG. 1 and FIG. 2.

At step 302, one or more features from a first conversation are extracted. In an embodiment, the microprocessor 202 may extract the one or more features from the first conversation between a first user and a customer care agent. In an embodiment, the first conversation may correspond to an ongoing conversation between the first user and the customer care agent over an electronic communication medium. In an embodiment, the electronic communication medium may include, but not limited to a SMS, a chat, social networks, an email, or a phone.

Prior to extracting the one or more features from the first conversation, the first user may utilize the first user-computing device 102 to initiate the first conversation with the customer care agent associated with the customer care agent-computing device 106. In an embodiment, the first conversation may take place through a VOIP session, a PSTN, a text messages, an email, or other messaging services. For instance, in an embodiment, the first user may utilize the first user-computing device 102 to initiate a VoIP session with the customer care agent associated with the customer care agent-computing device 106. In an embodiment, the scope of the disclosure is not limited to setting the VoIP session with the customer care agent-computing device 106. In an embodiment, the first user-computing device 102 may utilize any known protocol to initiate a call with the customer care agent-computing device 106. In an embodiment, the first user may utilize an audio capturing device attached or coupled to the first user-computing device 102 to communicate with the customer care agent. In an embodiment, the first user-computing device 102 may process an audio signal captured by the audio capturing device (i.e., the audio signal corresponding to the first user) and the audio signal received from the customer care agent-computing device 106 over the network 110. In an embodiment, the first user-computing device 102 may initiate a call with the customer care agent through public switched telephone network (PSTN).

After establishing the call with the customer care agent, the first user may ask a problem/query/issue/complaint/request to the customer care agent. Thereafter, the customer care agent may provide one or more responses corresponding to the problem/query/issue/complaint/request asked by the first user. For example, a first user may ask a query such as "I updated my gs2 on ATT to the newest version that the device could be updated to. How do you take a screen capture?" to the customer care agent. Further, the customer care agent may utilize the customer care agent-computing device 106 to provide one or more responses pertaining to the query such as, "Ok this is what you do . . . Press and hold the volume down and the power button at the same time" to the first user.

In alternate embodiment, the first user associated with the first user-computing device 102 may transmit a message or an email corresponding to the problem/query/issue/complaint/request to the customer care agent. Further, the customer care agent may further transmit a message comprising the one or more responses pertaining to the problem/query/issue/complaint/request asked by the first user.

A person skilled in the art will understand that the scope of the disclosure should not be limited to the above-mentioned electronic communication medium only for establishing the first conversation between the first user and the customer care agent. In an embodiment, the microprocessor 202 may employ other electronic communication medium such as social networks, etc., to establish the first conversation, without departing from the scope of the disclosure.

Thereafter, the monitoring unit 210 extracts the one or more features of the first conversation. In an embodiment, the one or more features may include, but not limited to, the first user's turnaround time, a customer care agent's turnaround time, a turn length of the first user, a turn length of the customer care agent, sentiments of the first user and the customer care agent, a speaking rate of the customer care agent, and the customer care agent's response delay. The one or more features has been described herein.

Turnaround Time Feature

In an embodiment, the microprocessor 202 may determine turnaround time feature by determining a time elapsed between the transmission of one or more queries from the first user to the customer care agent and the reception of one or more responses corresponding to the query from the customer care agent to the first user. In an embodiment, the turnaround time may correspond to the first user's turnaround time, and the customer care agent's turnaround time. For example, if the customer care agent spends 10 minutes in responding to the query asked by the first user, then the turnaround time of the customer care agent is 10 minutes. In an embodiment, the customer care agent's turnaround time may also refer to a response delay. Therefore, the response delay corresponds to a delay at the customer care agent's end, to respond to a query from the first user.

In an embodiment, the microprocessor 202 may determine the turnaround time by analyzing the audio signal (in a scenario where the conversation is audio conversation) of the conversation between the first user and the customer care agent. In an embodiment, the microprocessor 202 may utilize techniques such as the automatic speech recognition techniques (ASR) to determine the turnaround time feature.

However, a person having ordinary skills in the art will understand that the scope of the disclosure is not limited to the analysis of the audio signal. In an embodiment, the microprocessor 202 may determine the turnaround time by analyzing a text conversation between the first user and the customer care agent. In an embodiment, the microprocessor 202 may utilize techniques such as the text processing techniques to determine the turnaround time feature.

Turn Length Feature

In an embodiment, the microprocessor 202 may determine the turn length by determining a duration of a time interval in which the first user interacts, in a conversation with the customer care agent. In an embodiment, such interaction may include the conversation over a text channel or an audio channel. For example in the conversation, during the first user's turn, if the first user asks a query to the customer care agent in "10" min, then the turn length of the first user is "10" min. Similarly, during the customer care agent's turn, if the customer care agent responds to the query asked by the first user in "15" minutes, then the turn length of the customer care agent is "15" minutes.

Speech Rate Feature

In an embodiment, the microprocessor 202 may determine the speech rate by determining the rate at which the customer care agent responds to the one or more queries asked by the first user. In an embodiment, the microprocessor 202 may analyze the audio signal of the customer care agent by using one or more speech recognition techniques to determine the speech rate. In order to determine the speech rate, the microprocessor 202 may determine a volume or a pitch of the customer care agent, pauses in the audio signal of the customer care agent, and so on, which in turn may be used by the microprocessor 202 to determine the speech rate. In an embodiment, the microprocessor 202 may utilize the automatic speech recognition techniques to determine the speech rate.

A person having ordinary skills in the art will understand that the scope of the disclosure is not limited to the determination of the speech rate based on the audio signal. In an embodiment, the microprocessor 202 may determine the speech rate (or a response rate) by analyzing the text conversation between the first user and the customer care agent. In case of the text conversation, the microprocessor 202 may determine the speech rate by determining the rate at which the customer care agent responds to the one or more queries asked by the first user. In an embodiment, the microprocessor 202 may utilize techniques such as the text processing techniques to determine the speech rate.

In an embodiment, the speech rate feature, the turn length feature and the turnaround time feature corresponds to numerical features. However, a person having ordinary skills in the art will appreciate that the scope of the disclosure is not limited to determining numerical features. In an embodiment, the microprocessor 202 may determine one or more categorical features from the first conversation. In an embodiment, the one or more categorical features may include sentiments feature, and turn of the first user and the customer care agent.

Sentiments Feature

In an embodiment, the microprocessor 202 may determine the sentiments by determining the feelings or emotions that the first user and the customer care agent have during the first conversation. In an embodiment, the sentiments may be determined based on a reaction of the first user during the ongoing conversation. For example, if the first user is not able to comprehend what the customer care agent is saying. Then, in such type of scenarios, the first user may get frustrated. In an embodiment, the microprocessor 202 may employee one or more known techniques to determine the sentiments of the first user and the customer care agent.

Turn of the First User and the Customer Care Agent Feature

In another embodiment, the microprocessor 202 may determine a number of times the first user and the customer care agent speak during each of the one or more historical conversations. For example, if there are two historical conversations, the microprocessor 202 determines the turn of the first user and the customer care agent during the duration of the two historical conversations. Following Table 1 illustrates the turn of the first user and the customer care agent in the two historical conversations:

TABLE 1

Turn of the first user and the customer care agent in the two historical conversations.

| | Turn numbers | | | | | | | | | |
|---|---|---|---|---|---|---|---|---|---|---|
| | 1 | 2 | 3 | 4 | 5 | 6 | 7 | 8 | 9 | 10 |
| Chat 1 | A | C | A | C | A | A | C | A | C | A |
| Chat 2 | A | C | A | A | C | A | A | A | C | A |

As depicted in Table 1, the microprocessor 202 determines the turn of the first user and the customer care agent in the two historical conversations. In an embodiment, the microprocessor 202 represents the turn of the first user as "C" and the turn of the customer care agent as "A", where "C" corresponds to a "Customer", and "A" corresponds to an "Agent". For example, at turn number "4", the microprocessor 202 indicates the turn of the first user "C" in the chat 1. On the other hand, the microprocessor 202 indicates the turn of the customer care agent "A" in the chat 2. Similarly, at turn number "8", the microprocessor 202 indicates the turn of the customer care agent "A" in the chat 1 and the chat 2.

Further, a person skilled in the art will understand that the scope of the disclosure should not be limited to the above extracted features only. In an embodiment, the microprocessor 202 may extract other features as well, without departing from the scope of the disclosure.

In an embodiment, the microprocessor 202 may employ one or more known Automatic Speech Recognition (ASR) techniques/text processing techniques to extract the one or more features from the first conversation. The automatic speech recognition techniques may include, but are not limited to HTK, Sphinx, and so on. For example, if a conversation takes place over an electronic communication medium such as a SMS, an email, or a message, then the microprocessor 202 may employ one or more text processing techniques to extract the one or more features.

A person skilled in the art will understand that the scope of the disclosure should not be limited to the above-mentioned techniques only for extracting the one or more features. In an embodiment, the microprocessor 202 may employ other techniques as well to extract the one or more features, without departing from the scope of the disclosure.

Further, the person having ordinary skill in the art will appreciate that the one or more features may vary if the conversation is a textual conversation. For example, the one or more features may include sentiments of the first user, the sentiments of the customer care agent, turn of the first user, turn of the customer care agent, turn length of the first user, turn length of the customer care agent, or the customer care agent's response delay.

In an embodiment, the microprocessor 202 may observe each of the one or more features for a complete duration of the first conversation. Further, the microprocessor 202 may extract values of each feature from the first conversation. In an embodiment, the values of the one or more features may be temporally ordered based on a time instance, in the first conversation, at which the value was observed/extracted. For example, for the first conversation involving the first user, the microprocessor 202 may extract values of the speech rate. In an embodiment, the microprocessor 202 may determine the values of the speech rate at a predefined time intervals during the duration of the first conversation. For instance, if the predefined time interval is three minutes, then the microprocessor 202 may determine the speech rate of the first user in the first conversation after every three minutes.

In alternate embodiment, the microprocessor 202 may determine the speech rate of the first user and the customer care agent during the duration in which the first user and the customer care agent speak in the first conversation. For example, the first user, in the first conversation, speaks between the timestamps "1" minute to "1" minute and "5" seconds of the first conversation, the microprocessor 202 may determine the speech rate of the first user between the "1" minute and "1" minute and "5" seconds of the first conversation. Similarly, the microprocessor 202 may determine the speech rate of the customer care agent in the first conversation.

A person skilled in the art will understand that the scope of the disclosure should not be limited to the above extracted features only for extracting the values of the feature. In an embodiment, the microprocessor 202 may extract other features such as sentiments of the first user and the customer care agent, the customer care agent's response delay, etc., and so on, to extract the values of the feature, without departing from the scope of the disclosure.

At step 304, one or more features from each of the one or more historical conversations are extracted. In an embodiment, the microprocessor 202 may extract the one or more features from each of the one or more historical conversations involving the first user. Prior to extracting the one or more features from the one or more historical conversations, the microprocessor 202 may extract the one or more historical conversations from the database server 108. In an embodiment, the one or more historical conversations may correspond to one or more past conversations between the first user and one or more customer care agents. Thereafter, the microprocessor 202 extracts the one or more features from the one or more historical conversations. In an embodiment, the microprocessor 202 may employ one or more known Automatic Speech Recognition (ASR) techniques/text processing techniques to extract the one or more features of the one or more historical conversations, as discussed above.

In an embodiment, the microprocessor 202 may observe each of the one or more features for a complete duration of a historical conversation from the one or more historical conversations. Further, the microprocessor 202 may extract values of each feature from each of the one or more historical conversations. In an embodiment, the values of the one or more features may be temporally ordered based on a time instance, in the historical conversation, at which the value was observed, as discussed above. For example, in an embodiment, the microprocessor 202 may determine the speech rate of the first user and the customer care agent from each of the one or more historical conversations. Further, the microprocessor 202 may arrange/order the values of the speech rate in accordance to their occurrence in the historical conversation. For example, following Table 2 illustrates observations of the speech rate in the historical conversation:

TABLE 2

Observations of rate of speech in the historical conversation_1.

| Conversations | Rate of speech values observed | | | | |
|---|---|---|---|---|---|
| Hist_conv_1 | 15 | 10 | 25 | 5 | 16 |

The values of the rate of speech observed in the historical conversation_1 are arranged according to the time at which the value of the rate of speech was observed. Similarly, the rate of speech feature is extracted/observed in each of the one or more historical conversations.

Further, the values of the rate of speech observed in each of the one or more historical conversations are arranged according to the occurrence of the historical conversation. For example, there are two historical conversations involving the first user, the microprocessor 202 determines the speech rate of the first user in the first historical conversation. Similarly, the speech rate in the second historical conversation is determined. Based on the occurrence of the two historical conversations, the microprocessor 202 may arrange the values of the speech rate from the first historical conversation and the second historical conversation.

A person skilled in the art will understand that the scope of the disclosure should not be limited to the above extracted features only. In an embodiment, the microprocessor 202 may extract other features such as sentiments of the first user and the customer care agent, the customer care agent's response delay, etc., and so on, (as discussed above) without departing from the scope of the disclosure.

At step 306, an average of observed values of the feature across the one or more historical conversations is determined. In an embodiment, the microprocessor 202 may determine the average of observed values of the feature of the one or more historical conversations involving the first user. In an embodiment, the microprocessor 202 may extract the values of each feature from each of the one or more historical conversations during the duration of each of the one or more historical conversations as discussed above. In an embodiment, the microprocessor 202 may employ an average computation technique to determine the average of observed values of each of the one or more features across the one or more historical conversations. In an embodiment, the average computation technique may include, but not limited to a group means over time technique.

In an embodiment, where the one or more features correspond to a categorical feature, the microprocessor 202 may employ, a threshold based sequential time delay embedding technique to determine an average of the values for the categorical features. In an embodiment, the microprocessor 202 may determine a frequency of occurrence of the values of a categorical feature during the duration of the historical conversation. Based on the frequency, the microprocessor 202 may create a dictionary of values. For example, referring to Table 1, the microprocessor 202 may concatenate three consecutive values (observed for the turn of the first user and the customer care agent) to create a sequence of occurrence of values. Such sequence of values are stored in the dictionary as words. For example, sequences like ACA, ACC, etc., are stored as words in the dictionary.

A person skilled in the art will understand that the scope of the disclosure should not be limited to the above-mentioned method only for determining the average of observed values of the feature from each of the one or more historical conversations. In an embodiment, the microprocessor 202 may employ other methods such as group means over time, technique, etc., to determine the average of values of the feature, without departing from the scope of the disclosure.

At step 308, values of the one or more features (determined from the first conversation) are compared with the average values of the corresponding one or more features (determined from the historical conversation) to determine a score for each of the one or more features. In an embodiment, the microprocessor 202 may compare the one or more features of the first conversation with the average of the corresponding one or more features extracted from the one or more historical conversations involving the first user. In an embodiment, the score may indicate a deviation of a value of the feature (observed in the first conversation) from the average of values of the feature. In an embodiment, the microprocessor 202 may determine the score for each feature of the first conversation by utilizing at least an anomaly detection technique, or a deviation computation technique. For example, an average value of a feature is 40 but a value observed from the first conversation (i.e., the ongoing conversation) is 50. Thus, the score (i.e., the deviation) for the feature is 10.

In an embodiment, where the one or more features correspond to a categorical feature, the microprocessor 202 may create sequence of the values observed from the first conversation. Thereafter, these sequences are compared with the sequences stored in the dictionary for the feature under consideration. The microprocessor 202 may determine if an anomaly is detected based on the comparison. In an embodiment, the microprocessor 202 may utilize following equation to determine the anomaly:

$$[Dict[w_i]] > \theta? \tag{1}$$

where, $\theta$ = Anomaly count threshold.

A person skilled in the art will understand that the scope of the disclosure should not be limited to the above-mentioned methods only for determining the score for each feature of the first conversation. In an embodiment, the microprocessor 202 may employ other methods as well to determine the score for each feature, without departing from the scope of the disclosure.

At step 310, score for each of the one or more features of the first conversation is aggregated. In an embodiment, the microprocessor 202 may aggregate the score for each of the one or more features of the first conversation. In an embodiment, the aggregation may be determined based on a weighted sum of the score associated with each of the one or more features of the first conversation. In an embodiment, the weights may be determined from the historical conversations depending on which features contribute to predicting the customer experience better.

In an embodiment, the microprocessor 202 may assign one or more weights to the score of each of the one or more features. In an embodiment, the weights are determined based on the priority; a measure of importance of the first user for the organization. Thereafter, the microprocessor 202 may determine the aggregated score.

At step 312, a check is performed whether the aggregated score is greater than a threshold value. In an embodiment, the microprocessor 202 may perform the check to determine whether the aggregated score is greater than the threshold value.

Prior to determining whether the aggregated score is greater than the threshold value, the microprocessor 202 determines the threshold value. In an embodiment, the microprocessor 202 may receive the threshold value from the customer care agent-computing device 106. In alternate embodiment, the microprocessor 202 may extract the threshold value from the database server 108. In another alternate embodiment, the microprocessor 202 may determine the threshold value based on the priority of the first user. Further, the threshold value may be specified by a supervisor or a customer care domain expert based on an extent to which a particular deployment of this solution is sensitive. For example, he/she can choose an anomaly threshold of 0.3 in a scale of 0-1 if he/she wishes to capture even slightest deviations or 0.8 otherwise if he/she is interested in capturing only strong deviations. In another embodiment, the threshold value may be estimated from the historical conversations depending on which features contribute to predicting the customer experience better.

If the microprocessor 202 determines that the aggregated score is not greater than the threshold value, then step 308 is performed, else step 314 is performed.

At step 314, first conversation of the first user is redirected to a third user during the first conversation. In an embodiment, the microprocessor 202 may redirect the first conversation of the first user to the third user based at least on the aggregation, or the determined aggregated score being greater than the threshold value (as discussed above). Thereafter, the third user manages the first conversation of the first user.

In alternate embodiment, the microprocessor 202 may redirect the first conversation of the first user to the third user based at least on an availability of the third user. For example, if the third user is not available during the first conversation, then the microprocessor 202 may not redirect the first conversation of the first user to the third user.

A person skilled in the art will understand that the scope of the disclosure should not be limited to the above-mentioned techniques only for redirecting the first conversation of the first user to the third user. In an embodiment, the microprocessor 202 may employ other techniques as well to redirect the first conversation of the first user to the third user, without departing from the scope of the disclosure.

At step 316, the score for each feature is updated. In an embodiment, the microprocessor 202 may update the score for each feature based at least on the redirected conversation of the first user to the third user, or the determined aggregated score being greater than the threshold value. In an embodiment, the microprocessor 202 may store the updated score for each feature in the database server 108.

Figure 4:
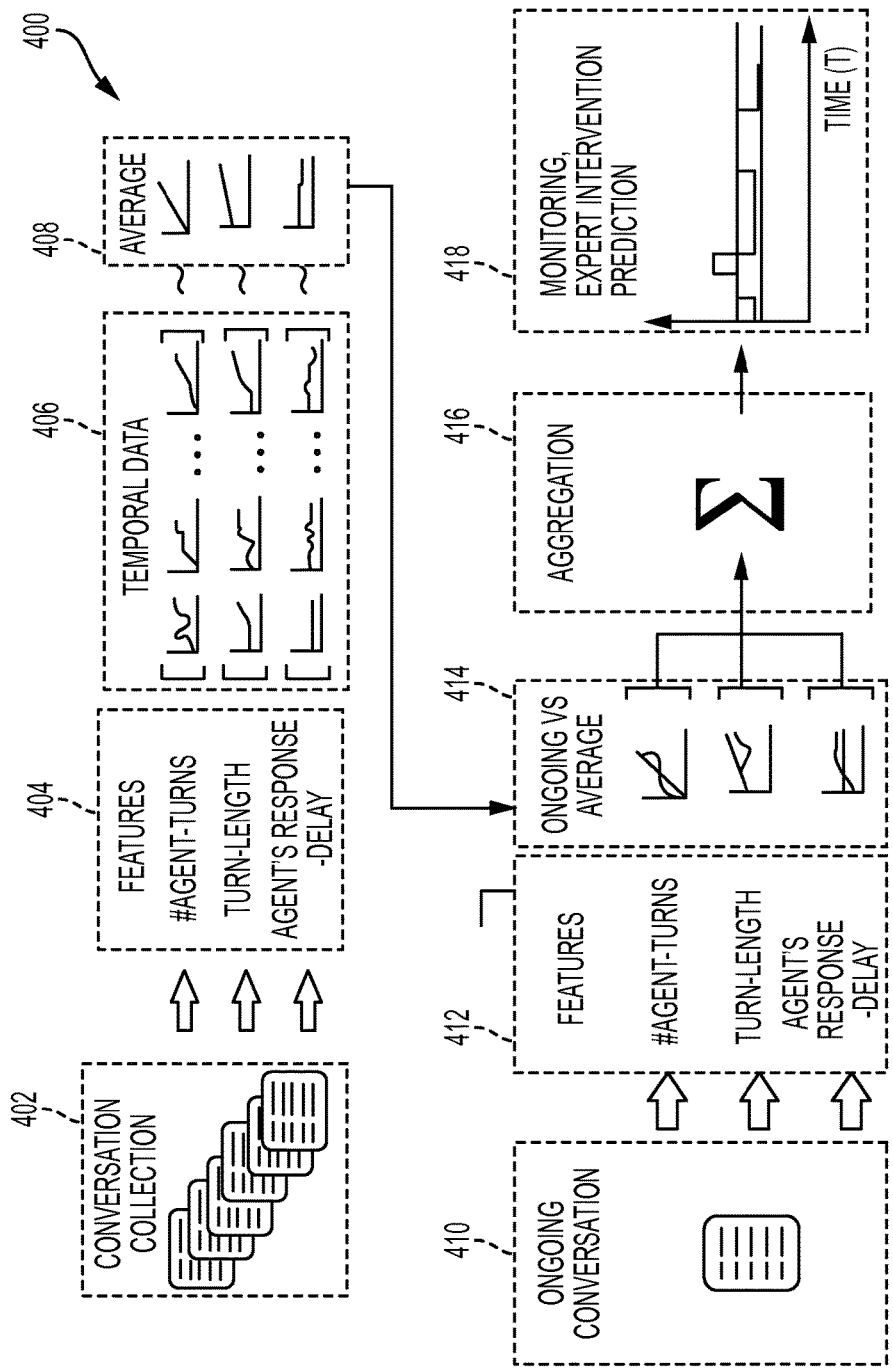
FIG. 4 is an example illustrating a method for managing a conversation between a first user and a customer care agent, in accordance with at least one embodiment.

FIG. 4 is an example 400 illustrating a method for managing a conversation between a first user and a customer care agent, in accordance with at least one embodiment. The example 400 has been described in conjunction with FIG. 1, FIG. 2, and FIG. 3.

As shown in the FIG. 4, the microprocessor 202 extracts the one or more historical conversations (depicted by 402) from the database server 108. Further, the microprocessor 202 extracts the one or more features from each of the one or more historical conversations involving the first user (depicted by 404). In an embodiment, the microprocessor 202 observes each of the one or more features for a complete duration of the one or more historical conversations. Further, the values of the one or more features may be sampled at a predefined time intervals during the duration of the conversation. In an embodiment, the values of the one or more features may be temporally ordered based on a time instance, in the conversation, at which the value was observed (depicted by 406). Thereafter, the microprocessor 202 determines the average of values of each feature observed for the one or more historical conversations (depicted by 408).

On the other, the microprocessor 202 consider the ongoing conversation (depicted by 410). Similarly, the microprocessor 202 extracts the one or more features (depicted by 412) of the ongoing conversation 410. Further, the microprocessor 202 determines the score. In an embodiment, the score (depicted by 414) may indicate the deviation of values of each feature (determined from the ongoing conversation) from the average of values of the feature (determined from the one or more historical conversations), as discussed above in FIG. 3. Further, the microprocessor 202 determines the aggregation of the score (depicted by 416). Based on the aggregation, the microprocessor 202 determines an aggregated score. In an embodiment, the microprocessor 202 determines whether an aggregated score is greater than the threshold value. Thereafter, based at least on the aggregated score being greater than the threshold value, or the availability of the third user, the microprocessor 202 redirects the ongoing conversation of the first user to the third user during the ongoing conversation (depicted by 418).

The disclosed embodiments encompass numerous advantages. Various embodiments of the disclosure lead to a method and a system for managing the conversation between a first user and a customer care agent. Through various embodiments of the disclosure, one or more features may be extracted from a first conversation (i.e., an ongoing conversation) between the first user and the customer care agent. Further, it is disclosed that a score for each feature of the first conversation is determined that indicates a deviation of a value of a feature from the average of observed values of the feature determined from each of the one or more historical conversations. Further, it is disclosed that the score for each of the one or more features is aggregated. Thereafter, based at least on the aggregation, or the availability of the third user, the call of the first user may be redirected to the third user during the first conversation. This method enables the customer care agent or the third user to reduce their time on identifying problems/queries/complaints of the first user. Further, the method discloses the good customer experience. This method for redirecting the call during the ongoing conversation is more robust.

The disclosed methods and systems, as illustrated in the ongoing description or any of its components, may be embodied in the form of a computer system. Typical examples of a computer system include a general purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit, and the internet. The computer further comprises a microprocessor. The microprocessor is connected to a communication bus. The computer also includes a memory. The memory may be RAM or ROM. The computer system further comprises a storage device, which may be a HDD or a removable storage drive such as a floppy-disk drive, an optical-disk drive, and the like. The storage device may also be a means for loading computer programs or other instructions onto the computer system. The computer system also includes a communication unit. The communication unit allows the computer to connect to other databases and the internet through an input/output (I/O) interface, allowing the transfer as well as reception of data from other sources. The communication unit may include a modem, an Ethernet card, or similar devices that enable the computer system to connect to databases and networks such as LAN, MAN, WAN, and the internet. The computer system facilitates input from a user through input devices accessible to the system through the I/O interface.

To process input data, the computer system executes a set of instructions stored in one or more storage elements. The storage elements may also hold data or other information, as desired. The storage element may be in the form of an information source or a physical memory element present in the processing machine.

The programmable or computer-readable instructions may include various commands that instruct the processing machine to perform specific tasks such as steps that constitute the method of the disclosure. The systems and methods described can also be implemented using only software programming, only hardware, or a varying combination of the two techniques. The disclosure is independent of the programming language and the operating system used in the computers. The instructions for the disclosure can be written in all programming languages including, but not limited to, "C," "C++," "Visual C++," and "Visual Basic." Further, software may be in the form of a collection of separate programs, a program module containing a larger program, or a portion of a program module, as discussed in the ongoing description. The software may also include modular programming in the form of object-oriented programming. The processing of input data by the processing machine may be in response to user commands, the results of previous processing, or from a request made by another processing machine. The disclosure can also be implemented in various operating systems and platforms, including, but not limited to, "Unix," "DOS," "Android," "Symbian," and "Linux."

The programmable instructions can be stored and transmitted on a computer-readable medium. The disclosure can also be embodied in a computer program product comprising a computer-readable medium, with any product capable of implementing the above methods and systems, or the numerous possible variations thereof.

Various embodiments of the methods and systems for managing the conversation between the first user and the customer care agent have been disclosed. However, it should be apparent to those skilled in the art that modifications, in addition to those described, are possible without departing from the inventive concepts herein. The embodiments, therefore, are not restrictive, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, used, or combined with other elements, components, or steps that are not expressly referenced.

A person with ordinary skills in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like.

The claims can encompass embodiments for hardware and software, or a combination thereof.

It will be appreciated that variants of the above disclosed, and other features and functions or alternatives thereof, may be combined into many other different systems or applications. Presently unforeseen or unanticipated alternatives, modifications, variations, or improvements therein may be subsequently made by those skilled in the art that are also intended to be encompassed by the following claims.

What is claimed is:

1. A method for managing, by a computing device, a conversation between a first user and a second user, said method comprising:

extracting, by one or more microprocessors in said computing device, one or more features from a first conversation between said first user and said second user, wherein said first conversation corresponds to an ongoing conversation over an electronic communication medium;

for a feature from said one or more extracted features:

determining, by said one or more microprocessors, a score for said feature, wherein said score indicates a deviation of a value of said feature from an average of values of said feature determined from one or more historical conversations, extracted from a database server over a communication network, involving said first user;

aggregating, by said one or more microprocessors, said score for each of said one or more features of said first conversation; and redirecting, by said one or more microprocessors, said first conversation of said first user to a third user during said first conversation based on said aggregated score, resulting in reduced time spent on identification of one or more queries of said first user.

2. The method of claim 1 further comprising extracting, by said one or more microprocessors, said one or more features from said one or more historical conversations involving said first user, by utilizing one or more speech or text processing techniques.

3. The method of claim 2 further comprising extracting, by said one or more microprocessors, values of said feature of each of said one or more historical conversations during a duration of each of said one or more historical conversations.

4. The method of claim 3 further comprising determining, by said one or more microprocessors, said average of values of said feature of each of said one or more historical conversations by utilizing an average computation technique, wherein said average computation technique comprises at least a threshold based sequential time delay embedding, or a group means over time technique.

5. The method of claim 1, wherein said first conversation is not redirected to said third user when said aggregated score is less than a threshold value.

6. The method of claim 1, wherein said first conversation is further redirected based on an availability of said third user and said determined aggregated score is greater than a threshold value.

7. The method of claim 1, wherein said one or more features comprise at least one of said first user's turnaround time, said second user's turnaround time, a turn length of said first user, a turn length of said second user, sentiments of said first user and said second user, a speaking rate of said second user, or said second user's response delay.

8. The method of claim 1, wherein said score for said feature is determined by utilizing at least an anomaly detection technique, or a deviation computation technique.

9. The method of claim 1, wherein said first user corresponds to a customer, a user, or a client.

10. The method of claim 1, wherein said second user corresponds to an automated agent, or a customer care representative.

11. The method of claim 1, wherein said third user corresponds to an expert, a supervisor, or a manager.

12. The method of claim 1, wherein said electronic communication medium comprises at least one of a short message service (SMS), a chat, social networks, an email, or a phone.

13. A system for managing, by a computing device a conversation between a first user and a second user, said system comprising:

one or more microprocessors in said computing device operable to:

extract one or more features from a first conversation between said first user and said second user, wherein said first conversation corresponds to an ongoing conversation over an electronic communication medium;

for a feature from said one or more extracted features:

determine a score for said feature, wherein said score indicates a deviation of a value of said feature from an average of values of said feature determined from one or more historical conversations, extracted from a database server over a communication network, involving said first user;

aggregate said score for each of said one or more features of said first conversation; and redirect said first conversation of said first user to a third user during said first conversation based on said aggregated score, resulting in reduced time spent on identification of one or more queries of said first user.

14. The system of claim 13, wherein said one or more microprocessors are further operable to extract said one or more features from said one or more historical conversations involving said first user by utilizing one or more speech or text processing techniques.

15. The system of claim 14, wherein said one or more microprocessors are further operable to extract values of said feature of each of said one or more historical conversations during a duration of each of said one or more historical conversations.

16. The system of claim 15, wherein said one or more microprocessors are further operable to determine said average of values of said feature of each of said one or more historical conversations by utilizing an average computation technique, wherein said average computation technique comprises at least a threshold based sequential time delay embedding, or a group means over time technique.

17. The system of claim 13, wherein said first conversation is not redirected to said third user when said aggregated score is less than a threshold value.

18. The system of claim 13, wherein said first conversation is redirected based at least on an availability of said third and said determined aggregated score is greater than a threshold value.

19. The system of claim 13, wherein said one or more features comprise at least one of said first user's turnaround time, said second user's turnaround time, a turn length of said first user, a turn length of said second user, sentiments of said first user and said second user, a speaking rate of said second user, or said second user's response delay.

20. The system of claim 13, wherein said score for said feature is determined by utilizing at least an anomaly detection technique, or a deviation computation technique.

21. The system of claim 13, wherein said first user corresponds to a customer, a user, or a client.

22. The system of claim 13, wherein said second user corresponds to an automated agent, or a customer care representative.

23. The system of claim 13, wherein said third user corresponds to an expert, a supervisor, or a manager.

24. The system of claim 13, wherein said electronic communication medium comprises at least one of a short message service (SMS), a chat, social networks, an email, or a phone.

25. A computer program product for use with a computer, the computer program product comprising a non-transitory computer readable medium, wherein the non-transitory computer readable medium stores a computer program code for managing a conversation between a first user and a second user, wherein the computer program code is executable by one or more microprocessors to:

extract, by one or more microprocessors in a computing device, one or more features from a first conversation between said first user and said second user, wherein said first conversation corresponds to an ongoing conversation over an electronic communication medium;

for a feature from said one or more extracted features:

determine, by said one or more microprocessors, a score for said feature, wherein said score indicates a deviation of a value of said feature from an average of values of said feature determined from one or more historical conversations extracted from a database server over a communication network, involving said first user;

aggregate said score for each of said one or more features of said first conversation; and redirect said first conversation of said first user to a third user during said first conversation based on said aggregated score, resulting in reduced time spent on identification of one or more queries of said first user.

\* \* \* \* \*